(12) United States Patent
Kozhipuram et al.

(10) Patent No.: US 10,814,987 B2
(45) Date of Patent: Oct. 27, 2020

(54) RECLINING CUSHION ASSEMBLY

(71) Applicant: AMI Industries, Inc., Colorado Springs, CO (US)

(72) Inventors: Akhil Rajagopal Kozhipuram, Karnataka (IN); Mahesh Virupaxi Hosmani, Karnataka (IN); Pavan Kumar Krishna Kumar, Karnataka (IN); Pradeep Acharya, Bangalore (IN)

(73) Assignee: AMI INDUSTRIES, INC., Colorado Springs, CO (US)

( * ) Notice: Subject to any disclaimer, the term of this patent is extended or adjusted under 35 U.S.C. 154(b) by 0 days.

(21) Appl. No.: 16/222,498

(22) Filed: Dec. 17, 2018

(65) Prior Publication Data
US 2020/0122837 A1    Apr. 23, 2020

(51) Int. Cl.
*B64D 11/06* (2006.01)
*B60N 2/22* (2006.01)

(52) U.S. Cl.
CPC .......... *B64D 11/064* (2014.12); *B60N 2/2227* (2013.01); *B64D 11/0647* (2014.12)

(58) Field of Classification Search
CPC .............. B64D 11/064; B64D 11/0647; B64D 11/0639; B60N 2/2227; B60N 2/22
USPC .................................................... 297/354.12
See application file for complete search history.

(56) References Cited

U.S. PATENT DOCUMENTS

| | | | |
|---|---|---|---|
| 3,037,812 A * | 6/1962 | Monroe | B64D 11/06 297/362.13 |
| 3,929,374 A | 12/1975 | Hogan et al. | |
| 4,512,604 A | 4/1985 | Maeda | |
| 4,634,180 A * | 1/1987 | Zaveri | B60N 2/123 248/430 |
| 5,468,045 A * | 11/1995 | Weber | B60N 2/2884 297/216.11 |
| 7,195,316 B2 * | 3/2007 | Shimasaki | A47C 7/024 297/284.11 |
| 7,837,259 B2 * | 11/2010 | Staab | B64D 11/06 244/118.5 |
| 8,328,284 B2 * | 12/2012 | Loomis | A47C 7/407 297/378.12 |

(Continued)

FOREIGN PATENT DOCUMENTS

| | | |
|---|---|---|
| DE | 202005004788 U1 | 7/2005 |
| EP | 1712410 A2 | 10/2006 |

(Continued)

OTHER PUBLICATIONS

Extended European Search Report; International Application No. 19204181.2-1010; International Filing Date: Oct. 18, 2019; dated Mar. 18, 2020; 11 pages.

*Primary Examiner* — Mark R Wendell
(74) *Attorney, Agent, or Firm* — Cantor Colburn LLP

(57) ABSTRACT

A reclining cushion assembly for a seat includes a fixed portion and a movable portion mounted to the fixed portion. The movable portion is movable between an upright position and a reclined position. At least one reclining and locking mechanism is mounted to the fixed portion. The at least one reclining and locking mechanism is movable between a first position and a second position. The at least one reclining and locking mechanism is operable to engage the movable portion to transform the movable portion from the upright position to the reclined position.

17 Claims, 10 Drawing Sheets

(56) References Cited

U.S. PATENT DOCUMENTS

| | | | | |
|---|---|---|---|---|
| 2009/0295209 A1* | 12/2009 | Lee | ................... | A47C 1/032 |
| | | | | 297/337 |
| 2014/0103688 A1* | 4/2014 | Wilson | ............... | A47C 1/03211 |
| | | | | 297/337 |
| 2014/0167474 A1* | 6/2014 | Jeong | ................... | B60N 2/2209 |
| | | | | 297/354.1 |
| 2016/0075260 A1* | 3/2016 | Atger | ................... | B60N 2/22 |
| | | | | 297/354.12 |

FOREIGN PATENT DOCUMENTS

| | | |
|---|---|---|
| EP | 3053774 A1 | 8/2016 |
| GB | 2563051 A | 12/2018 |

\* cited by examiner

RECLINING CUSHION ASSEMBLY

CROSS-REFERENCE TO RELATED APPLICATIONS

This application claims the benefit of Indian Application No. 201811039814, filed Oct. 22, 2018, which is incorporated herein by reference in its entirety.

BACKGROUND

Exemplary embodiments of the disclosure relate to seats on an aircraft, and more particularly, to a removable cushion assembly for use with a seat on an aircraft.

Aircraft crew attendant seats, or jump seats, are commonly provided in cockpits or passenger cabins. The crew attendant seats located in the cabin are typically used by the passenger cabin flight attendant crew, especially during takeoff and landing, and are typically located near an emergency exit to allow a flight attendant to readily open an exit door if necessary, in the event of an emergency. Such passenger cabin crew attendant seats are also commonly designed to be folded when not in use to maintain clear pathways to emergency exits.

The seats on an aircraft are frequently subject to specific regulations and requirements based on the occupant and location of the seat. For example, a seat in the aircraft cabin, regardless of whether the seat is a passenger seat or a crew attendant seat, may be required to have a backrest with the ability to tilt at least 45 degrees with respect to a vertical position, in addition to further criteria.

BRIEF DESCRIPTION

According to an embodiment, a reclining cushion assembly for a seat includes a fixed portion and a movable portion mounted to the fixed portion. The movable portion is movable between an upright position and a reclined position. At least one reclining and locking mechanism is mounted to the fixed portion. The at least one reclining and locking mechanism is movable between a first position and a second position. The at least one reclining and locking mechanism is operable to engage the movable portion to transform the movable portion from the upright position to the reclined position.

In addition to one or more of the features described above, or as an alternative, in further embodiments the movable portion is rotatable about an axis defined at an upper edge of the cushion assembly.

In addition to one or more of the features described above, or as an alternative, in further embodiments the at least one reclining and locking mechanism is rotatable about an axis.

In addition to one or more of the features described above, or as an alternative, in further embodiments the movable portion further comprises an engagement surface, and the at least one reclining and locking mechanism further comprises a cam having a surface arranged in contact with the engagement surface.

In addition to one or more of the features described above, or as an alternative, in further embodiments as the at least one reclining and locking mechanism rotates about the axis from a first position to a second position, the engagement between the engagement surface and the cam rotates the movable portion from the upright position to the reclined position.

In addition to one or more of the features described above, or as an alternative, in further embodiments the surface of the cam includes a groove and when the reclining and locking mechanism is in the second position, the engagement surface is received within the groove.

In addition to one or more of the features described above, or as an alternative, in further embodiments engagement between the groove and the engagement surface restricts movement of the cushioning assembly.

In addition to one or more of the features described above, or as an alternative, in further embodiments the fixed portion includes a rigid base affixable to a seat structure.

In addition to one or more of the features described above, or as an alternative, in further embodiments the fixed portion includes at least one side plate, the at least one reclining and locking mechanism being mounted to the at least one side plate.

In addition to one or more of the features described above, or as an alternative, in further embodiments the fixed portion includes a first side plate and a second side plate disposed at opposing sides of the cushion assembly, and the at least one reclining and locking mechanism includes a first reclining and locking mechanism coupled to the first side plate and a second reclining and locking mechanism coupled to the second side plate.

In addition to one or more of the features described above, or as an alternative, in further embodiments the first reclining and locking mechanism and the second reclining and locking mechanism are operably coupled.

In addition to one or more of the features described above, or as an alternative, in further embodiments the movable portion includes a cushion attached to an insert panel.

In addition to one or more of the features described above, or as an alternative, in further embodiments when the movable portion is in the reclined position, an angle of recline is about 15 degrees.

According to another embodiment, a seat includes a seat frame having an upper portion and a lower portion. The upper portion is movable relative to the lower portion to achieve a first angle of recline. A cushion assembly is attached to a portion of the seat frame and is movable between an upright position and a reclined position to achieve a second angle of recline, distinct from the first angle of recline.

In addition to one or more of the features described above, or as an alternative, in further embodiments the seat and the cushion assembly are independently operable.

In addition to one or more of the features described above, or as an alternative, in further embodiments the second angle of recline is compounded with the first angle of recline.

In addition to one or more of the features described above, or as an alternative, in further embodiments the cushion assembly is removably mounted to the seat frame.

According to yet another embodiment, a method of reclining a seat includes reclining a seat frame to achieve a first angle of recline and operating a reclining mechanism of a cushion assembly affixed to the seat frame to achieve a second angle of recline.

In addition to one or more of the features described above, or as an alternative, in further embodiments the first angle of recline and the second angle of recline are compounded.

In addition to one or more of the features described above, or as an alternative, in further embodiments the first reclining mechanism and the second reclining mechanism are independently operable.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Figure 1:
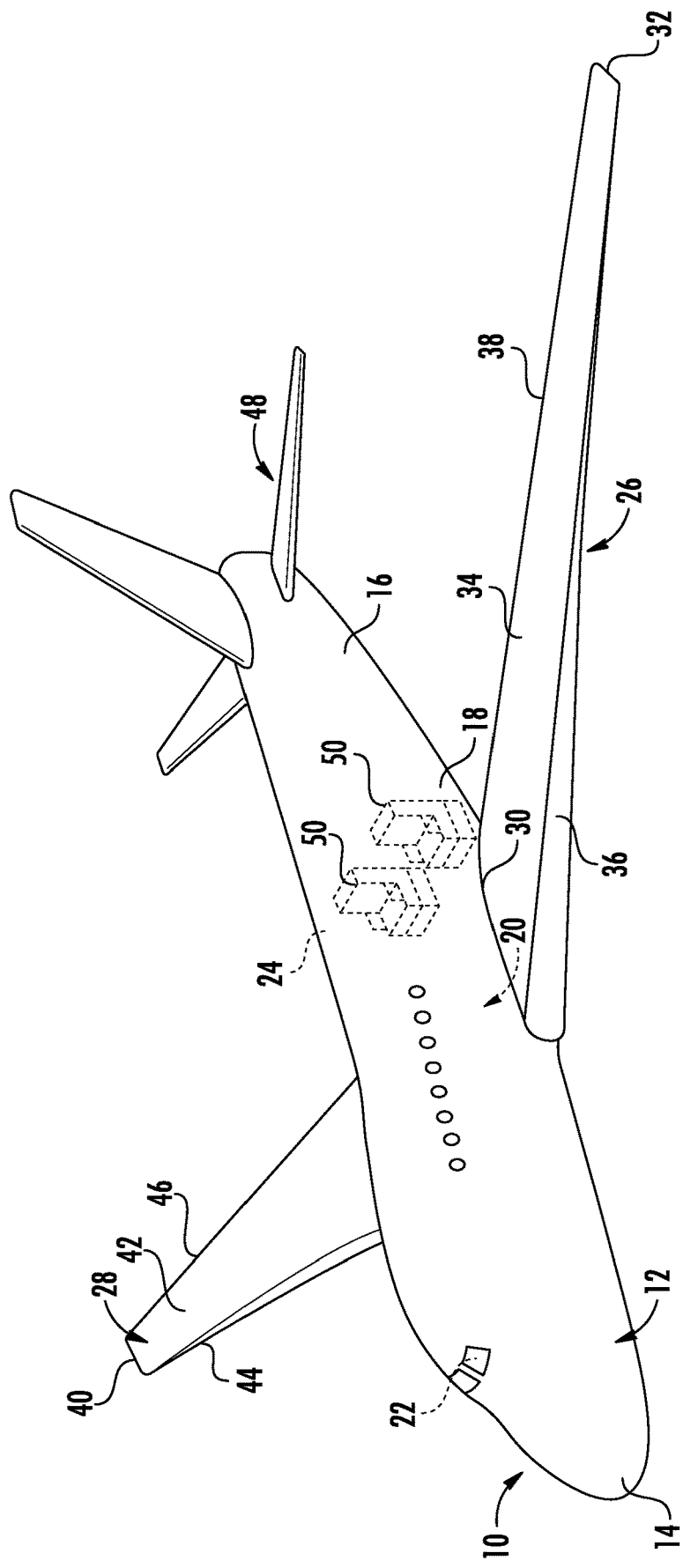
FIG. 1 is a perspective view of an example of an aircraft that may incorporate embodiments of the present disclosure.

Referring now to FIG. 1, a perspective view of an example of an aircraft 10 is illustrated. The aircraft 10 includes a fuselage 12 which houses an aircraft cabin 20 that includes a crew compartment or cockpit 22 and a passenger compartment 24. Aircraft 10 includes one or more seats 50 in the passenger compartment 24. Alternatively, or in addition, the seats 50 may be mounted within the crew compartment 22. As will be appreciated by those of skill in the art, although the seats 50 are illustrated and described herein with respect to an aircraft, the seats 50 may also be mounted within a building and/or within various types of vehicles including but not limited to automotive, aerospace, naval, locomotive, and railway vehicle for example.

Figure 2:
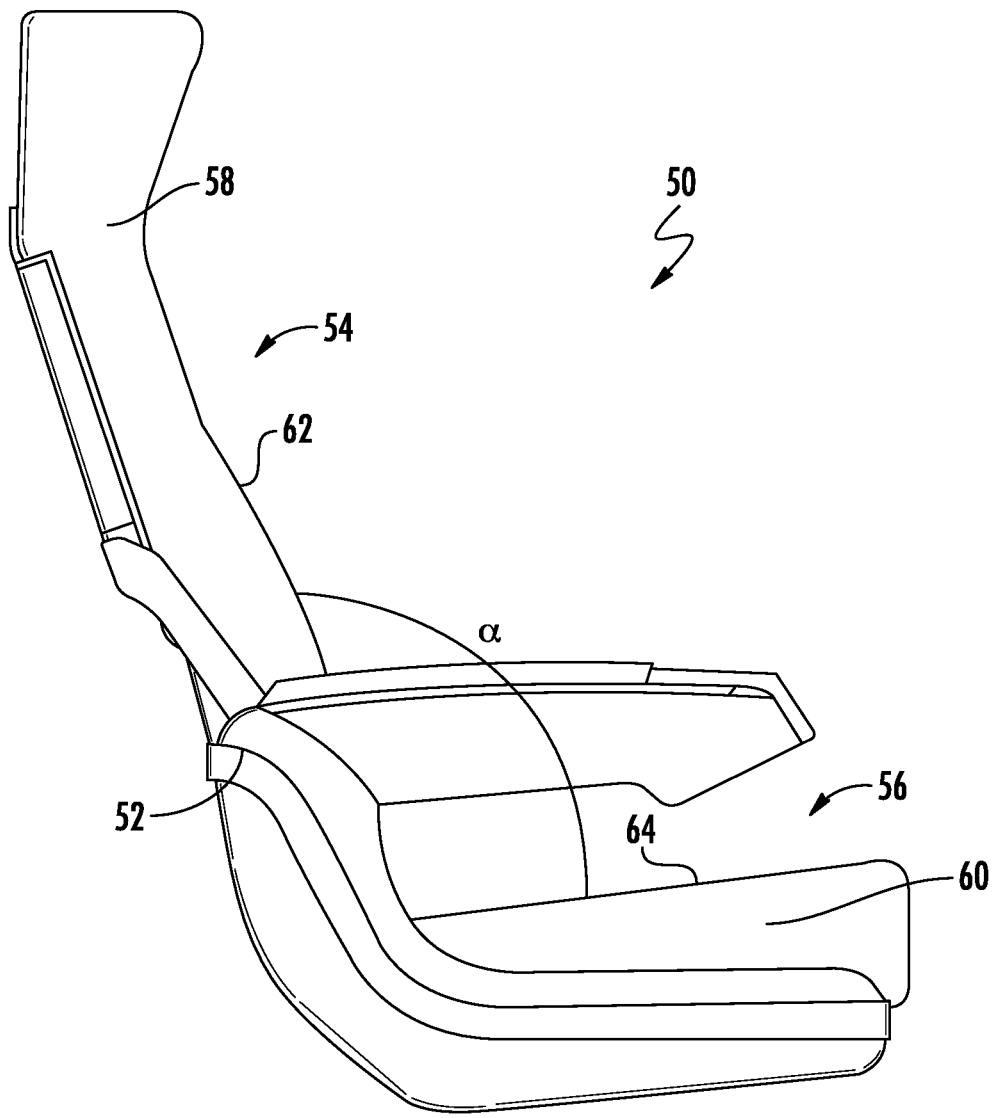
FIG. 2 is a side-view of an example of a known seat structure commonly used on an aircraft.
Figure 3:
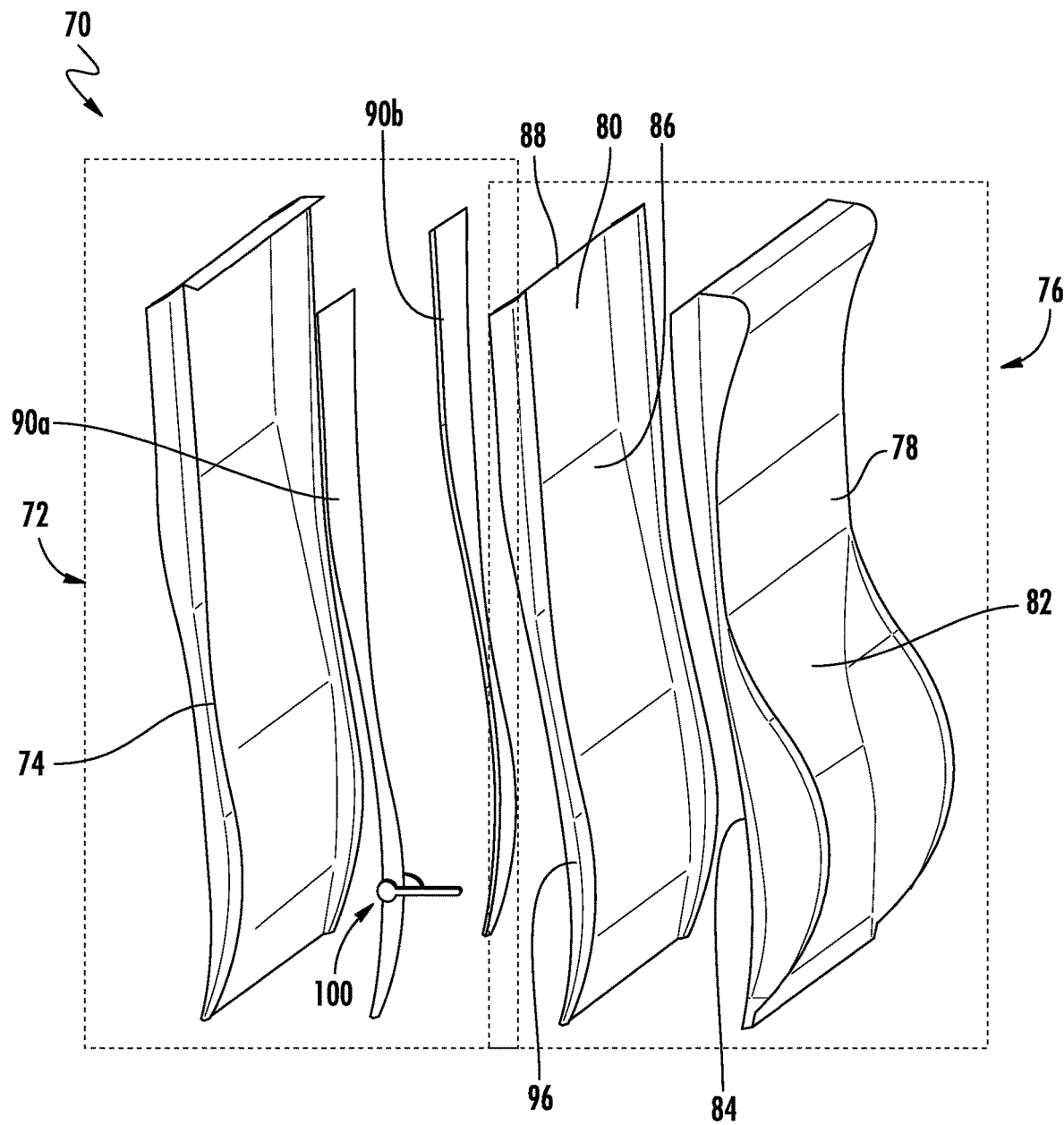
FIG. 3 is an exploded perspective view of a cushion assembly according to an embodiment.
Figure 4:
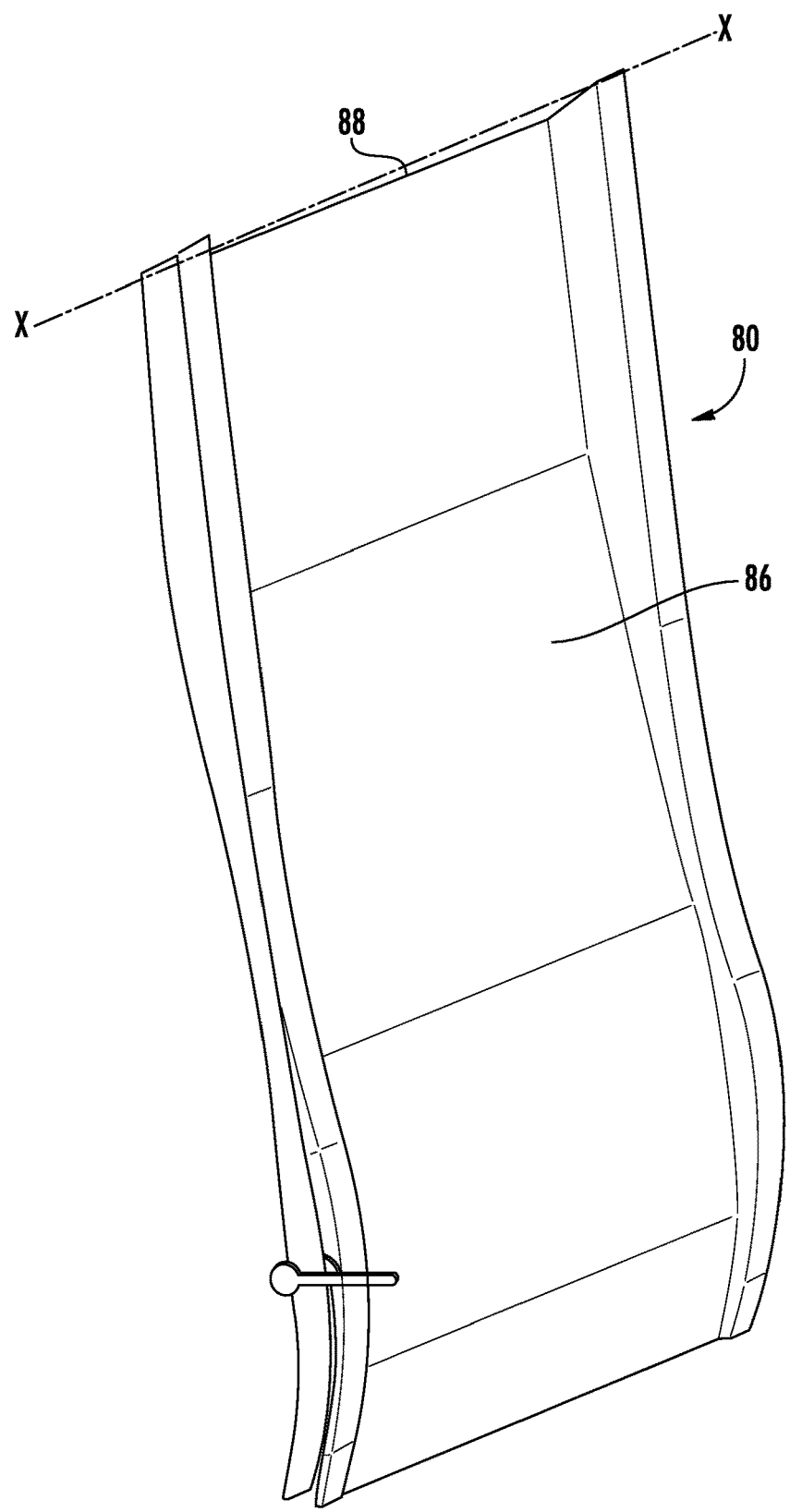
FIG. 4 is a perspective view of a portion of the cushion assembly of FIG. 3.

FIG. 2 is a simplified version of a seat 50 according to an embodiment. The seat 50 includes a frame 52 that defines an upper seat portion 54, also known as a seat back, and a lower seat portion 56, also referred to as a seat base. As shown, the upper seat portion 54 typically has a first cushion 58 connected thereto, and the lower seat portion 56 typically has a second cushion 60 connected thereto. In an embodiment, the first and second cushions 58, 60 are configured to removably affix to the respective portions of the frame 52.

Although the first and second cushions 58, 60 are illustrated as being separate from one another, embodiments where the first and second cushions 58, 60 are integrated formed as a single cushion mountable to the frame 52 are also within the disclosure.

Further, in an embodiment, the frame 52 may include one or more mechanisms (not shown), such as a coupling element for example, that allow the upper portion 54 to move relative to the lower portion 56 of the seat 50. For example, movement at the coupling element may cause the seat back 54 to partially recline relative to the seat base 56. In this reclined position, the angle α defined between the surface 62 of the seat back 54 and the surface 64 of the seat base 56 to be engaged by a user is greater than when the seat 50 is in an upright position.

With reference now to FIGS. 3-7, an embodiment of a cushion assembly 70 suitable for use as cushion 58 coupled to the upper seat portion of a seat, such as seat 50 for example, is illustrated. A first portion 72 of the cushion assembly 70 includes a stiff or rigid base 74 configured to mount to the frame 52 of the seat 50. The base 74 may affix to the frame 52 via any suitable connection mechanism, such as via sliding engagement or one or more fasteners for example. In the illustrated, non-limiting embodiment, the overall size and shape of the base 74 is similar or identical to the frame 52 at the upper seat portion 54. However, embodiments where the base 74 of the cushion assembly 70 is different than the frame 52 at the upper seat portion 54, such as smaller in size for example, are also contemplated herein.

The second portion 76 of the cushion assembly 70 includes a cushion 78 attached to an insert panel 80. As shown, the cushion 78 includes a front surface 82 configured to receive the back of a person seated within seat 50 and an opposite back surface 84. The front surface 82 may be molded or have one or more contours formed therein to make engagement between a user and the cushion 78 more comfortable. The back surface 84 of the cushion 78 may be permanently fixed to an adjacent surface 86 of the insert panel 80, such as via an adhesive or other bonding agent for example. However, embodiments where the back surface 84 is removably coupled to the insert panel 80 using fasteners are also within the scope of the disclosure. In addition, the cushion 78 may be formed from any suitable material. For example, in an embodiment, the cushion 78 is made from a molded plastic. Alternatively, the cushion 78 may be formed from a fabric material filled with a foam core or other suitable filling material.

The insert panel 80 may similarly be formed from any suitable material, such as a lightweight composite material for example. As shown, the overall size and shape of the insert panel 80 is identical to the size and shape of the cushion 78 such that the edges of the affixed cushion 78 and insert 80 are substantially aligned. However, embodiments where the insert panel 80 is smaller than, bigger than, and/or has a different shape than the cushion 78 are also within the scope of the disclosure.

The second portion 76 of the cushion assembly 70 is connected to the first portion 72 of the cushion assembly 70 via a coupling mechanism (not shown) such that the second portion 76 is movable relative to the fixed first portion 72. In the illustrated, non-limiting embodiment, the coupling mechanism is positioned such that the second portion 76 of the cushion assembly 70 is rotatable about an axis X defined at an upper edge 88 of the cushion assembly 70. In such embodiments, the coupling mechanism may include one or more hinges.

The fixed first portion 72 of the cushion assembly 70 additionally includes at least one rigid side plate 90 positioned adjacent a side of the cushion assembly 70. The sides of the cushion 78 are distinct from and extend at an angle to the front and back surfaces, such as surfaces 82, 84, 86 for example and insert panel 80 of the cushion assembly 70. In the illustrated, non-limiting embodiment, the cushion assembly 70 includes a first side plate 90a located at a first side 92 of the cushion assembly 70 and a second side plate 90b located at a second, opposite side 94 of the cushion assembly 70.

Figure 7A:
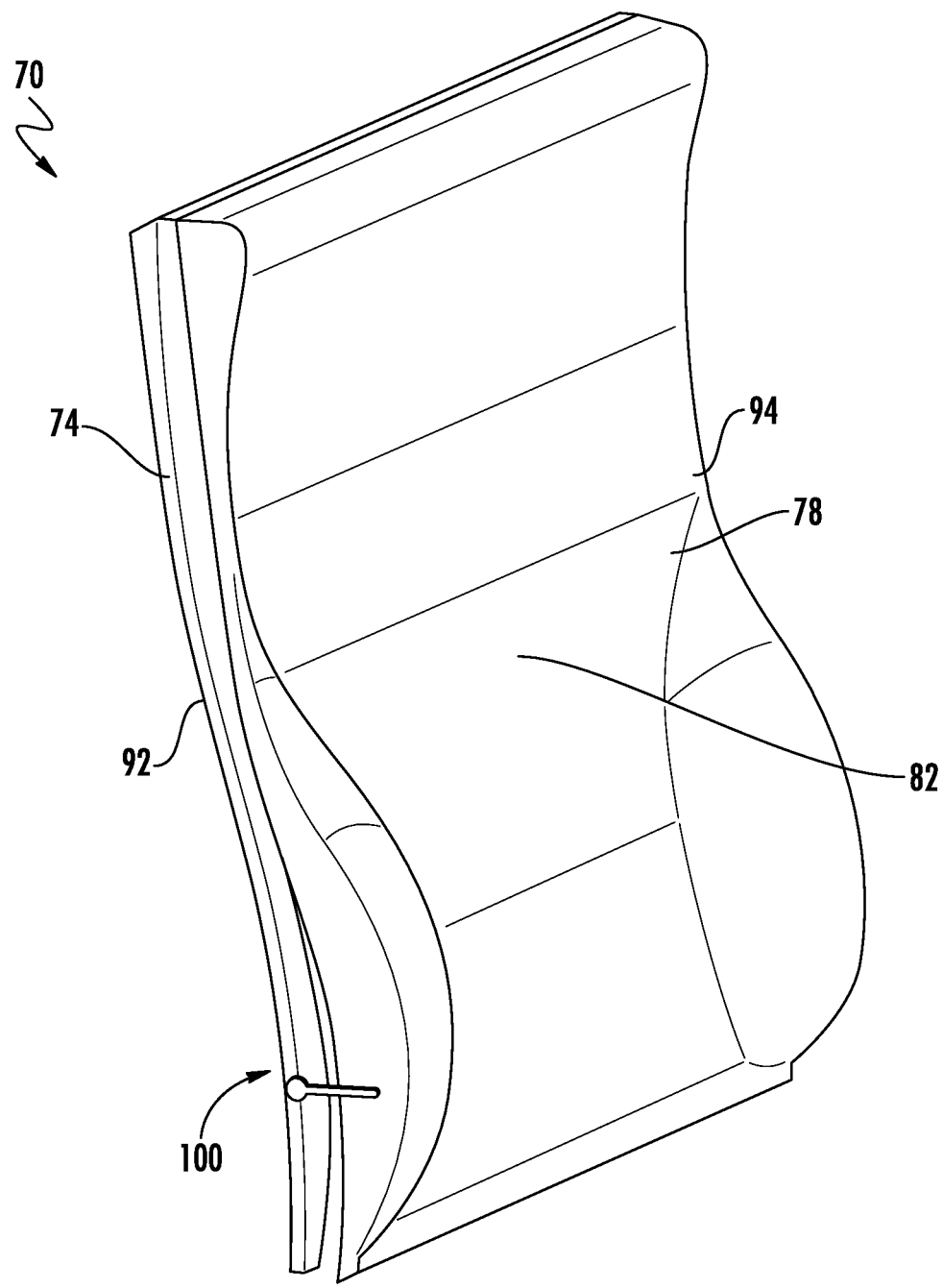
FIG. 7A is a perspective view of a cushion assembly in a reclined position according to an embodiment.
Figure 7B:
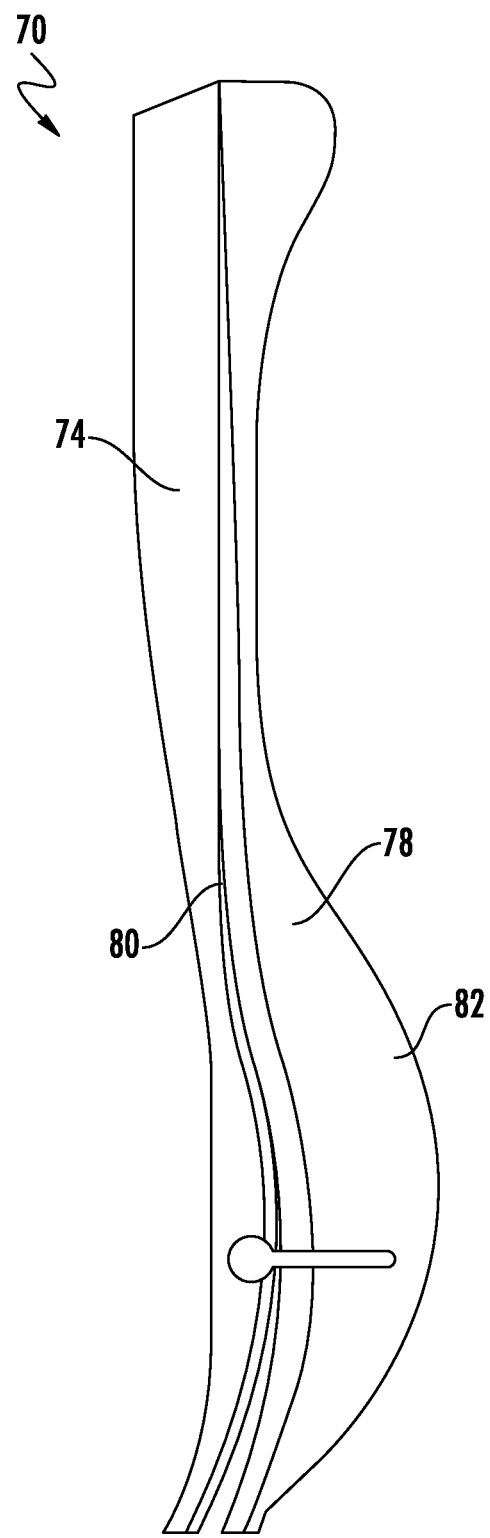
FIG. 7B is a side view of the cushion assembly of FIG. 7A in a reclined position according to an embodiment.

Affixed to the at least one rigid side plate 90 is a reclining and locking mechanism 100. In an embodiment, the reclining and locking mechanism is spaced vertically away from the upper edge 88 defining the rotational axis X, towards a free end of the movable second portion 76. The reclining and locking mechanism 100 is operable to transform the movable second portion 76 of the cushion assembly 70 between an upright position (FIGS. 6A and 6B) and a reclined position (FIGS. 7A and 7B). In an embodiment, a first reclining and locking mechanism 100 is connected to the first side plate 90a, and a second, substantially identical reclining mechanism (not shown) is connected to the second side plate 90b. In such embodiments, the reclining and locking mechanisms 100 may be operably coupled via one or more linkages, such as arranged adjacent a back surface of the base 74, or between the base 74 and the insert panel 80 for example, to ensure an even rotation of the movable second portion 76 across a width of the cushion assembly 70. Alternatively, embodiments where a portion of a single and locking reclining mechanism 100 extends across the width of the cushion assembly 70 to ensure even rotation are also within the scope of the disclosure.

Figure 5A:
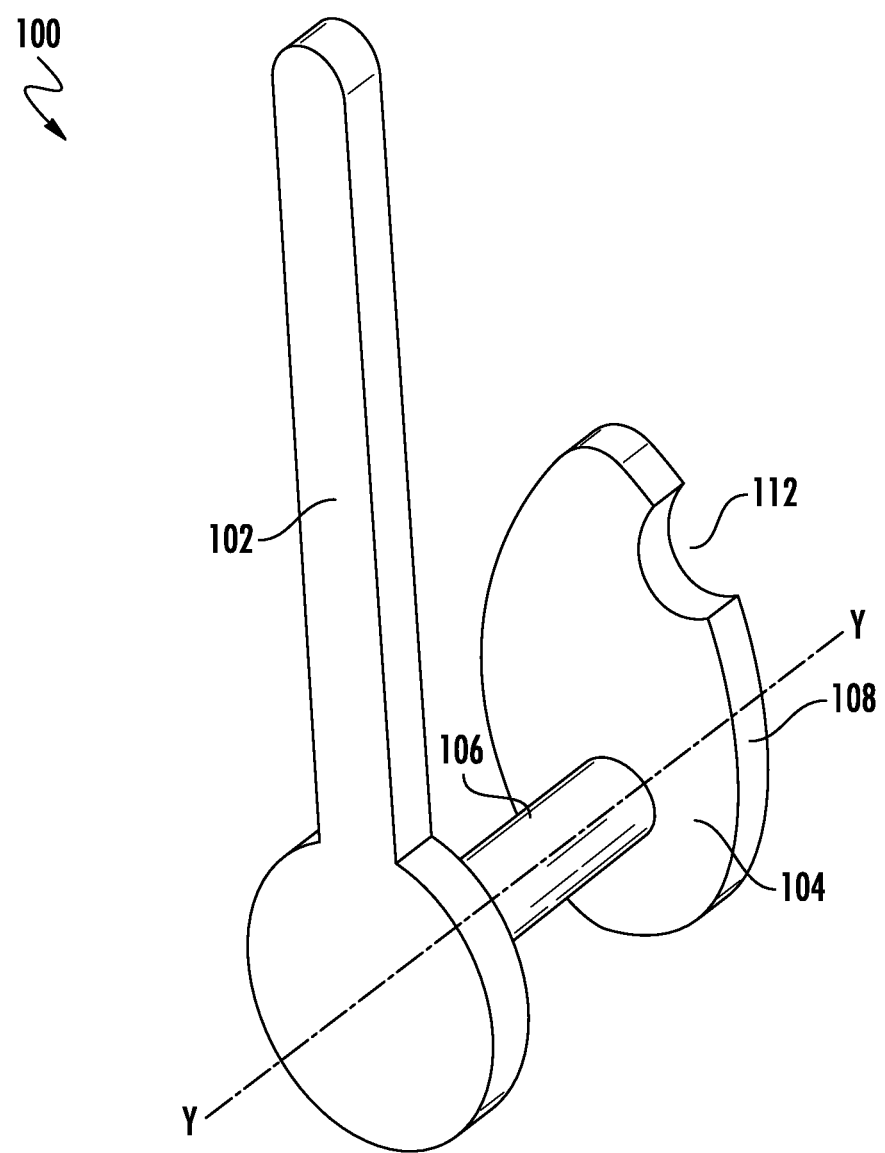
FIG. 5A is a perspective view of a reclining and locking mechanism of the cushion assembly in a first position according to an embodiment.
Figure 5B:
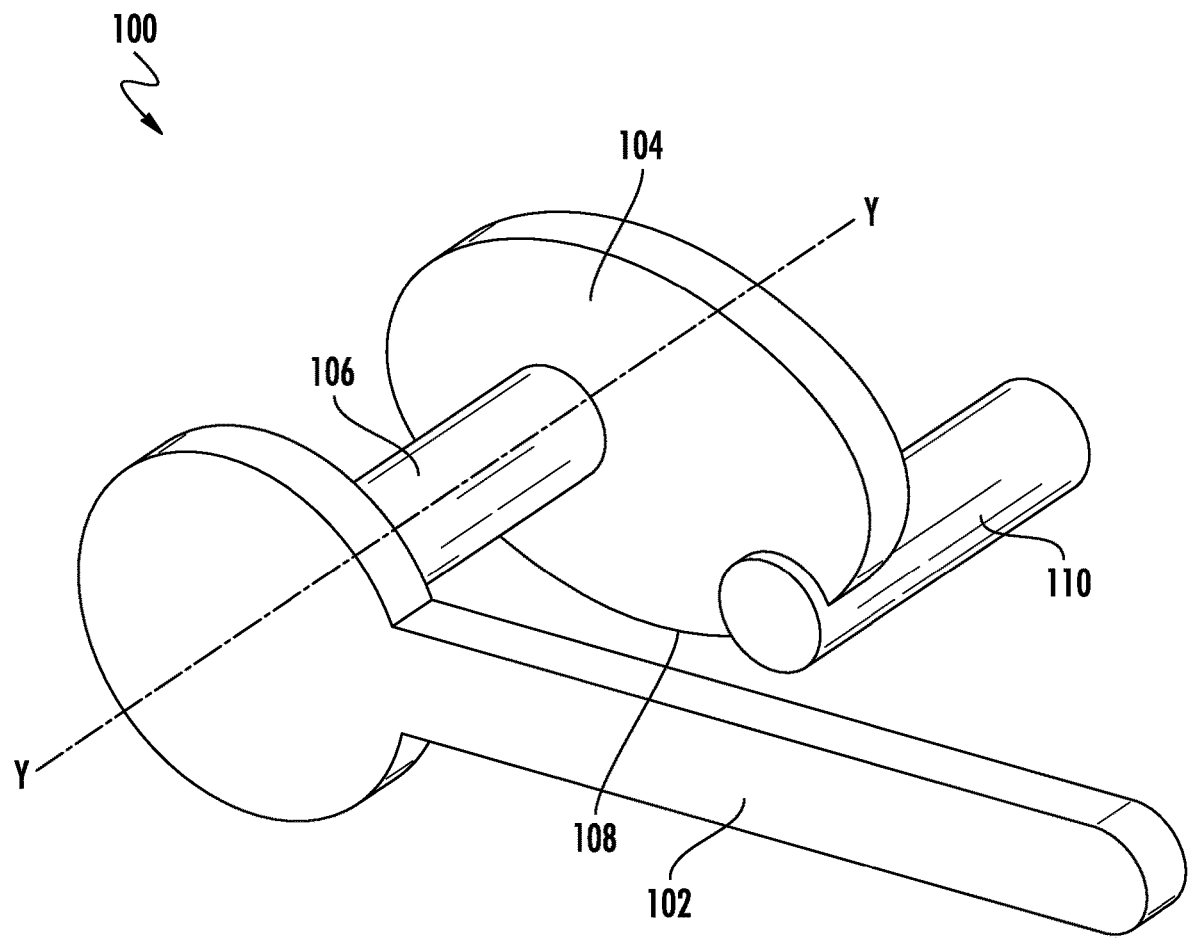
FIG. 5B is a perspective view of a reclining and locking mechanism of the cushion assembly in a second position according to an embodiment.
Figure 6A:
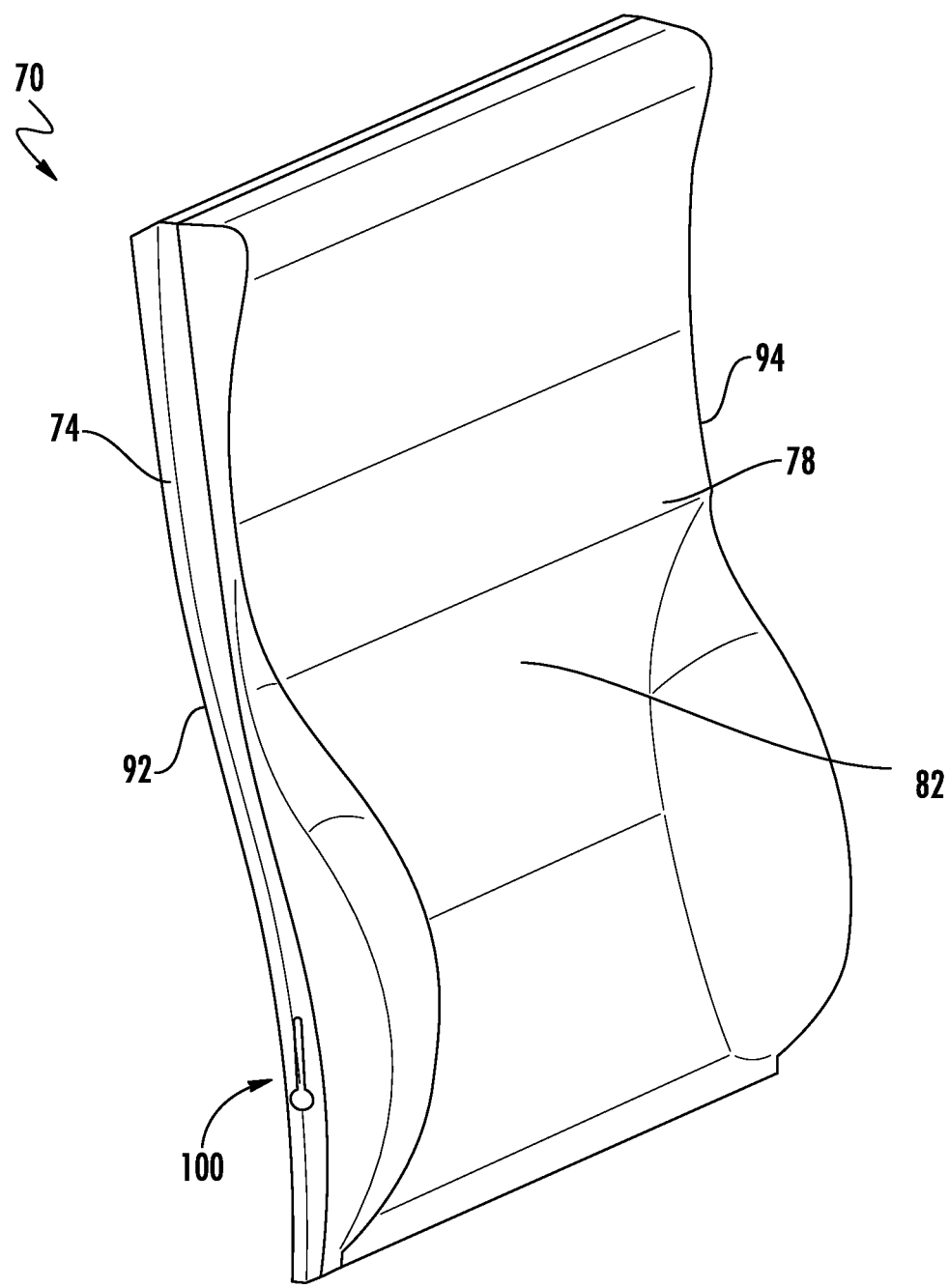
FIG. 6A is a perspective view of a cushion assembly in an upright position according to an embodiment.
Figure 6B:
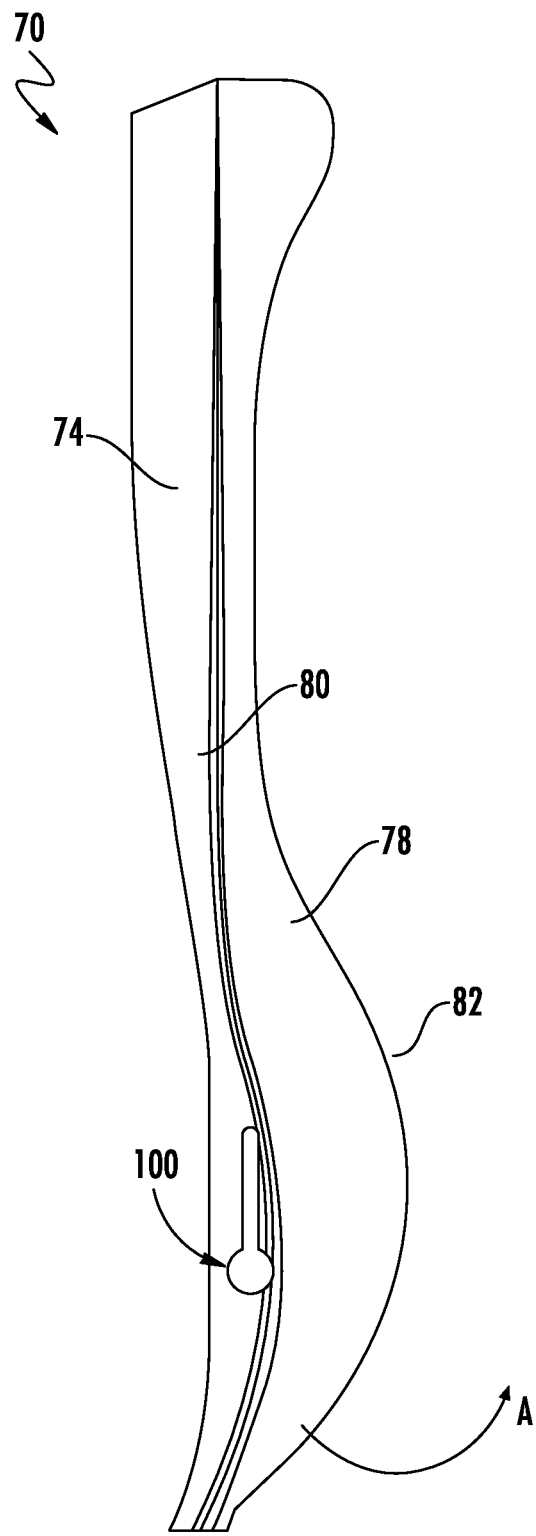
FIG. 6B is a side view of the cushion assembly of FIG. 6A in an upright position according to an embodiment.

An example of the reclining and locking mechanism 100 is illustrated in more detail in FIGS. 5A and 5B. As shown, the reclining and locking mechanism 100 includes a lever 102 connected to a cam 104 by a shaft 106. In an embodiment, the shaft 106 extends through the side plate 90 such that the lever 102 is disposed adjacent a first outer surface of the side plate 90 and the cam 104 is located adjacent a second, inner surface of the side plate 90. A surface 108 of the cam 104 is configured to cooperate with an engagement surface 96 of the insert panel 80. The surface 108 of the cam 104 additionally has a groove 112 formed therein to receive the engagement surface 96. In the illustrated, non-limiting embodiment, engagement surface 96 is formed as part of an engagement member 110 extending from the movable second portion 76, such as the insert panel 80, of the cushion assembly 70. However, embodiments where the engagement member 110 is connected to the cushion 78 are also within the scope of the disclosure. When the engagement surface 96 of the engagement member 110 is received within the groove 112, the movable second portion 76 is in the reclined position, and rotation of the movable second portion 76 about axis X is restricted.

With reference now to FIGS. 6 and 7, operation of the reclining and locking mechanism 100 is shown in more detail. In the illustrated, non-limiting embodiment, when the cushion assembly 70 is in the upright position, the reclining and locking mechanism 100 is in a first configuration (FIG. 5A). In the first configuration, the lever 102 may extend generally vertically, parallel to the side plate 90. As the lever 102 is rotated about the axis Y defined by the shaft 106 to a second position, the surface 108 of the cam 104 contacts and applies a force to the adjacent engagement surface 96 of the insert panel 80. This force causes the free end of the movable second portion 76 to rotate about the axis X of the coupling mechanism, in a direction indicated by arrow A. This movement of the free end of the movable second portion 76 will occur until the second portion 76 reaches the reclined position where the engagement member 110 is seated within the groove 112 formed in the cam 104. In an embodiment, lever 102 is oriented generally horizontally when in the second position (see FIG. 5B). Further, the movable second portion 76 of the cushioning assembly 70 may be configured to achieve an angle of recline of about 15 degrees via the reclining and locking mechanism 100. However, any degree of recline may be achieved by the reclining and locking mechanism 100. For example, the cushioning assembly 70 may recline up to 20 degrees, up to 30 degrees, up to 45 degrees, or more than 45 degrees via the reclining and locking mechanism 100.

To return the movable second portion 76 of the cushioning assembly 70 back to the upright position, the lever 102 is rotated back to the first position to disengage the engagement surface 96 and/or the engagement member 110 from the groove 112 of the cam 104. Application of a force by a user to the free end of the movable second portion 76, or alternatively gravity, will cause the movable second portion 76 to pivot about the axis X back to the upright position.

When the cushioning assembly 70 is affixed to an upper seat portion 54, such as of seat 50 for example, the angle of recline achieved by the cushioning assembly 70 may be compounded with the angle of recline achieved by the seat frame 52. Accordingly, inclusion of a cushioning assembly 70 not only increases the angle of recline that may be achieved, but also provides a user with greater flexibility in selecting a desired position because the recline of the cushioning assembly 70 is independently operable from the recline of the frame 52 of the seat 50.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A reclining cushion assembly for a seat comprising:
   a fixed portion including a side plate;
   a movable portion mounted to the fixed portion, the movable portion being movable between an upright position and a reclined position, wherein in the reclined position, a lower end of the movable portion is offset from a surface of the fixed portion; and
   at least one reclining and locking mechanism mounted to the side plate of the fixed portion, the at least one reclining and locking mechanism being movable between a first position and a second position, wherein the at least one reclining and locking mechanism is operable to engage the movable portion to transform the movable portion from the upright position to the reclined position.

2. The reclining cushion assembly of claim 1, wherein the movable portion is rotatable about an axis defined at an upper edge of the cushion assembly.

3. The reclining cushion assembly of claim 1, wherein the at least one reclining and locking mechanism is rotatable about an axis.

4. The reclining cushion assembly of claim 3, wherein the movable portion further comprises an engagement surface, and the at least one reclining and locking mechanism further comprises a cam having a surface arranged in contact with the engagement surface.

5. The reclining cushion assembly of claim 4, wherein as the at least one reclining and locking mechanism rotates about the axis from a first position to a second position, the engagement between the engagement surface and the cam rotates the movable portion from the upright position to the reclined position.

6. The reclining cushion assembly of claim 4, wherein the surface of the cam includes a groove and when the reclining and locking mechanism is in the second position, the engagement surface is received within the groove.

7. The reclining cushion assembly of claim 6, wherein engagement between the groove and the engagement surface restricts movement of the cushioning assembly.

8. The reclining cushion assembly of claim 1, wherein the fixed portion includes a rigid base affixable to a seat structure.

9. The reclining cushion assembly of claim 1, wherein the fixed portion includes a first side plate and a second side plate disposed at opposing sides of the cushion assembly, and the at least one reclining and locking mechanism includes a first reclining and locking mechanism coupled to the first side plate and a second reclining and locking mechanism coupled to the second side plate.

10. The reclining cushion assembly of claim 9, wherein the first reclining and locking mechanism and the second reclining and locking mechanism are operably coupled.

11. The reclining cushion assembly of claim 1, wherein the movable portion includes a cushion attached to an insert panel.

12. The reclining cushion assembly of claim 1, wherein when the movable portion is in the reclined position, an angle of recline is about 15 degrees.

13. A seat comprising:
a seat frame having an upper portion and a lower portion, the upper portion being movable relative to the lower portion to achieve a first angle of recline; and
a cushion assembly attached to a portion of the seat frame, the cushion assembly being movable between an upright position and a reclined position to achieve a second angle of recline, distinct from the first angle of recline; and
at least one reclining and locking mechanism operable to move the cushion assembly between the upright position and the reclined position, wherein the seat frame and the cushion assembly are independently operable.

14. The seat of claim 13, wherein the second angle of recline is compounded with the first angle of recline.

15. The seat of claim 13, wherein the cushion assembly is removably mounted to the seat frame.

16. A method of reclining a seat comprising:
reclining an upper portion of a seat frame relative to a lower portion of a seat frame to achieve a first angle of recline; and
operating at least one reclining and locking mechanism mounted to the seat frame and associated with a cushion assembly affixed to a portion of the seat frame, wherein operating the at least one reclining and locking mechanism moves the cushion assembly between an upright position and a recline position to achieve a second angle of recline, wherein the seat frame and the cushion assembly are independently operable.

17. The method of claim 16, wherein the first angle of recline and the second angle of recline are compounded.

* * * * *